Oct. 25, 1966  B. S. NELSON  3,280,648
VARIABLE-RATIO DRIVE MECHANISM
Filed May 8, 1964  5 Sheets-Sheet 1

INVENTOR.
BERTEL S. NELSON
BY
Gordon C. Mack
ATTORNEY

Oct. 25, 1966   B. S. NELSON   3,280,648
VARIABLE-RATIO DRIVE MECHANISM
Filed May 8, 1964   5 Sheets-Sheet 2

INVENTOR.
BERTEL S. NELSON
BY
ATTORNEY

Oct. 25, 1966  B. S. NELSON  3,280,648
VARIABLE-RATIO DRIVE MECHANISM
Filed May 8, 1964  5 Sheets-Sheet 3

INVENTOR.
BERTEL S. NELSON
BY
ATTORNEY

Oct. 25, 1966　　　　B. S. NELSON　　　　3,280,648
VARIABLE-RATIO DRIVE MECHANISM

Filed May 8, 1964　　　　　　　　　　　　5 Sheets-Sheet 4

INVENTOR.
BERTEL S. NELSON
BY
ATTORNEY

United States Patent Office 3,280,648
Patented Oct. 25, 1966

3,280,648
VARIABLE-RATIO DRIVE MECHANISM
Bertel S. Nelson, Hinsdale, Ill., assignor to Imperial Electric Company, Akron, Ohio, a corporation of Ohio
Filed May 8, 1964, Ser. No. 365,890
13 Claims. (Cl. 74—230.17)

The invention relates to variable-ratio drive means which utilizes a V-belt and automatic centrifugally operated actuating mechanism to alter the ratio of the effective diameters of a driver sheave on the shaft of a power source, such as an electric motor, and a driven sheave on an output shaft.

Whereas it has been usual to provide variable-ratio drive mechanisms to vary the speed of an output shaft during operation; the mechanism of the present invention is designed primarily for providing a preset maximum speed and it provides for presetting the maximum speed of operation while the power source is at a stand still as well as while it is operating.

Generally the centrifugal actuating means is located on the driver shaft, but it may be on the output shaft. The sheave on the shaft with which the centrifugal means is connected is formed of separable cones to provide a variable diameter sheave for the V-belt, and usually one of these cones is fixed to the shaft, although both cones may be axially movable along the shaft. The diameter of this sheave is increased as the speed of rotation of the shaft increases. In operation the preset final position of the actuating means is always reached when the driver shaft is running at its normal operating speed, whereas in other systems in which the operation is centrifugally controlled it is customary to have the weights assume a position which is determined by the actual speed of the driver shaft.

The sheave on the other shaft may also be formed of separable cones, one or both of which are axially movable along the shaft, but this is not necessary, because a fixed diameter sheave may be used here, and it need not provide a V section. If the diameter of this sheave is not variable, the center distance between the two shafts is variable, and either a spring-loading mechanism or a weight-loaded mechanism or the like is utilized to increase the distance between the shafts when the drive mechanism is at rest. The spring or weight is used to produce the tensioning of the belt required to maintain the necessary friction for driving through the belt, and when operating, the centrifugal mechanism must provide sufficient force to overcome the spring or weight and bring the shafts closer together.

In a preferred form of the invention, the centrifugal means is provided by weights attached to one of the sheave cones which swing out as the shaft rotates, and the weights each comprise at least one tooth of a gear sector which meshes with a tooth rack interposed between the centrifugal means and a movable sheave cone, as will be described in detail in connection with the drawings. The gear and rack can be replaced by equivalent mechanism, e.g., wedge- or ball-shaped weights can be interposed between opposing dish-shaped members which rotate on an axis of symmetry coincident with the shaft centerline. Alternatively, a fluid can be used between such dish-shaped members. On rotation, the dish-shaped members would move apart under the influence of the wedges, balls, fluid or other weight thrown outward by centrifugal force. The extent the dish-shaped members could be separated would be limited by suitable stop means to limit either the radial or axial separation of the members. In operation, the fixed stop position is always reached regardless of the belt position.

An important feature of the invention is the provision of adjustable stop means for controlling the distance the sheave cones can be separated, and thus controlling the operating sheave diameter.

In a preferred form of the drive mechanism of this invention, the sheaves on both the driver shaft and the output shaft are formed of separable cones. The cones of the sheave on the output shaft are spring loaded so that when the motor is not operating they are forced together. This forces the V-belt toward the circumference of this sheave, and simultaneously pulls the belt toward the axis of the driver sheave, separating its cones. However, when the motor is operating, the weighted centrifugal means pivoted on one cone of the driver sheave, forces these cones together. The belt is thus forced to move to a larger pitch diameter in the driver sheave, causing it to move to a smaller pitch diameter in the driven sheave, forcing the cones of that sheave to separate by a force greater than that of the spring loading. A variable limit is provided which controls the extent to which the centrifugal force can move the cones of the driver sheave together. In this manner the position of the belt in the driving sheave is controlled and a maximum diameter of the sheave on the driver shaft is thus preset, to control the maximum speed of rotation of this shaft. The position of the variable limit can be adjusted either while the motor is at rest or while it is in motion.

The centrifugal means which moves the cones of the driver sheave together comprises weights on swing arms pivoted to the outer surface of the adjustable cone of this sheave. The action of these swing arms in forcing the cones of the driver sheave together will be described in detail in what follows. Briefly, there is a stop element, usually a cup, located around the drive shaft which is adjustable axially of the shaft to control the spacing of the cones of the sheave on this shaft, and thus determine the ratio setting. The end of this stop element nearest the sheave is formed with a surface having the profile of a tooth rack. The unweighted end of the swing arm is shaped as a gear sector. When the motor is running, the weighted end of the swing arm is lifted against the cone, throwing the unweighted end and gear sector into rolling or sliding engagement with said rack surface, pushing the cones of the driving sheave together. The spacing of the cones, when the motor is running, is therefore dependent on the position of the stop element.

When the power is shut off, as the motor decelerates the spring-pressed cone of the sheave on the output shaft forces these cones together, and the belt forces the cones of the driver sheave apart. Thus, the cones of the sheave on the output shaft always come to rest in substantially the same position corresponding to the lowest speed of the output shaft. This takes place, no matter what the ratio setting is.

The invention is further described in connection with the accompanying drawings, in which.

Figure 1:
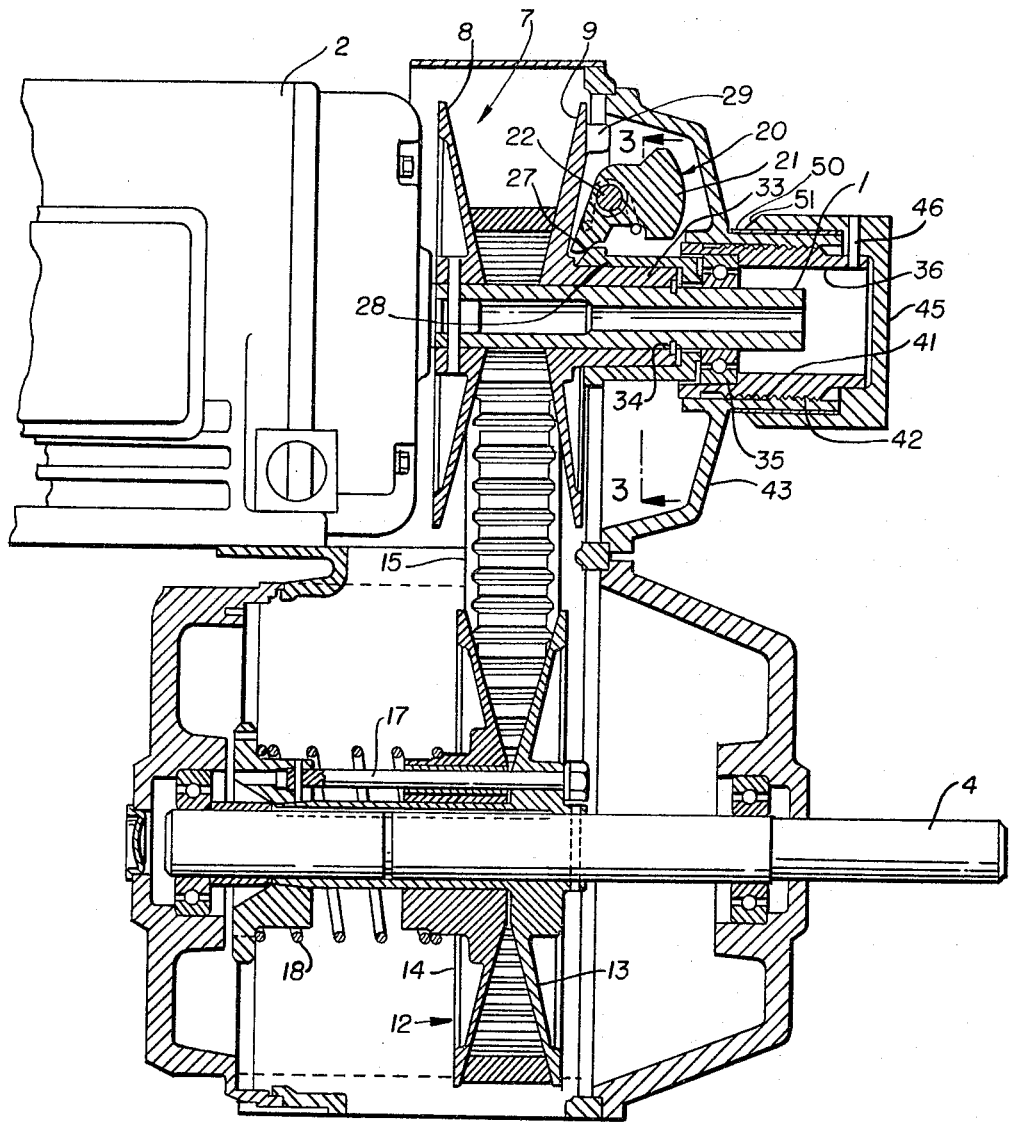
FIGURE 1 is a plan view (or elevation), partly in section, of a motor or other source of power with a driver shaft and a sheave thereon which is connected by a belt to a sheave on an output shaft, with preferred means for adjusting the ratio setting of the cones of the respective sheaves; the cones of the sheave on the driver shaft being separated as when the mechanism is at rest.

The drive shaft 1 on the motor 2, and the output shaft 4 may be arranged side by side, or one above the other.

The driver sheave 7 on the driver shaft 1 is composed of the fixed cone 8 and slidable cone 9. The driven sheave 12 on the output shaft is composed of the fixed cone 13 and slidable cone 14. These sheaves are connected by the V-belt 15.

The cone 14 of the sheave 12 slides on the rods 17, of which there are preferably three. Instead of using rods for locating, guiding and transmitting torque from the adjustable half of the sheave, splines, keys or other means may be used. The compression spring 18 presses the cone 14 toward the cone 13.

Figure 2:
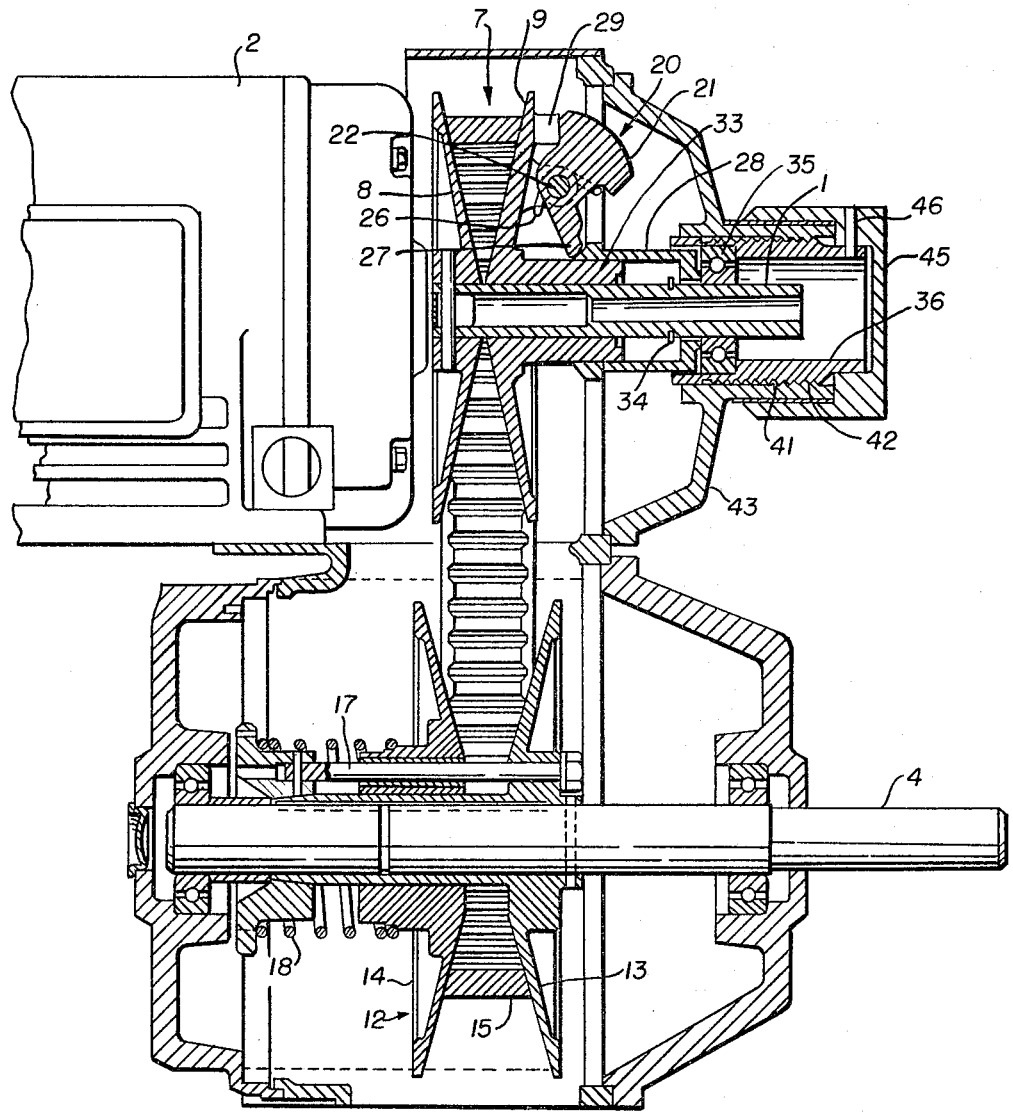
FIGURE 2 is a similar view, but with the elements in the position they occupy when the motor is running.
Figure 3:
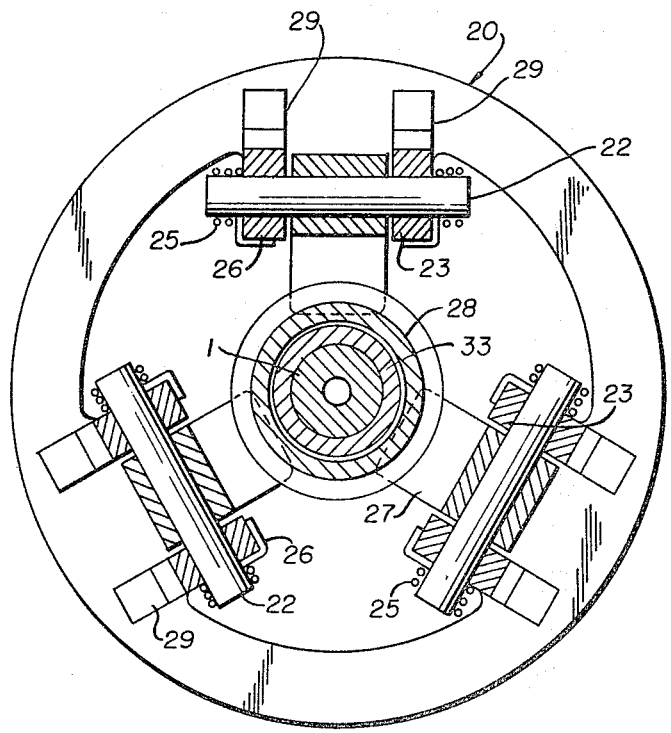
FIGURE 3 is an elevation of the outer surface of the adjustable cone of the sheave on the drive shaft, on the line 3—3 of FIGURE 1.

On the outer face of the adjustable cone 9 of the sheave 7 are three swing-arms 20 the outer ends 21 of which are weighted. They are pivotally mounted on clevis pins 22 (FIGURE 3) supported in clevises 23. In the shoulder on the under side of each swing arm between the weighted end 21 and the pivoted portion, is a portion 25 of a torsion spring 26, each end of which is wrapped around one of the clevis pins (FIGURE 3) and then folded against the clevis to prevent the swing arm from rattling when starting or stopping the motor. In operation, the weight is lifted toward stop 29, and continued lifting applies pressure to stop means 28 (the description of which follows immediately) that is adjustable to provide any desired ratio setting, and this forces cone 9 toward cone 8 until the weight reaches stop 29, lifting the belt to a desired level in the sheave 7, as shown in FIGURE 2.

Figure 4:
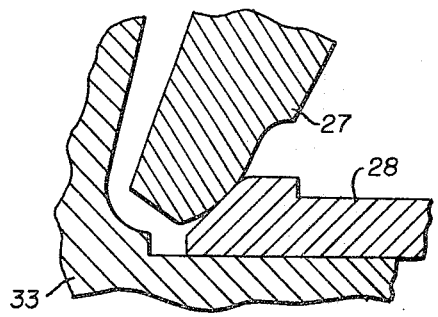
FIGURE 4 is an enlarged detail of one of the swing arms in contact with the edge of a stop element in the control mechanism.

The end 27 of the swing arm has a contact surface toward the adjustable stop element or cup 28 that has a gear tooth profile (FIGURE 4). The surface of cup 28 with which the bottom 27 of the swing arm is brought into contact, has the profile of a tooth rack. This profile may be continuous around the circumference of the lip, or it may be intermittent to provide the profile only at the locations where the unweighted end of the swing arm makes contact.

The cup 28 has an opening in its bottom and is adapted to slide on the tubular extension 33 of the cone 9 which surrounds the drive shaft 1. The snap ring 34 acts as a stop to limit the extent to which the cone 9 can travel out along the shaft 1. The bottom of the cup abuts the bearing 35 which is press-fit into the sleeve 36 which is concentric with the drive shaft. This sleeve is threaded externally at 41 and meshes with internal threads on the tubular extension 42 of the housing 43. The speed control knob 45 is pinned at 46 to the sleeve 36.

The swing arms 20 swing freely on the pins 22 (except for the non-rattling springs 26). As centrifugal force lifts the weighted ends 21 of the swing arms away from the axis of the cone 9, their bottoms 27 push out against the rim of the cup 28, which abuts the bearing 35, the position of which is controlled by knob 45. As centrifugal force lifts the weights, the cone 9 is clamped against cone 8 and this elevates the belt 15 between these cones, against the pressure of the spring-loaded cone 14 of the sheave 12.

By rotating the knob 45, sleeve 36, bearing 35 and cup 28 are moved in and out with respect to the housing 43, along the drive shaft 1. The torsion or anticlatter spring 26 keeps the unweighted end of the swing weights 20 in contact with the rack-shaped tip of the cup 28, when the unit is at rest. As the control knob 45 is turned, the distance the weighted ends must swing before contacting the stop surface 29 is varied and hence the travel together of the driver cones.

The pitch of the threads 41, 42 is preferably of micrometer fineness, permitting accurate adjustment and control of the speed of the drive shaft. Other means for controlling the position of cup 28, can replace knob 45.

When at rest (FIGURE 1) the weighted ends of the swing arms exert no pressure to clamp the cones 8 and 9 together. They are separated because of the pressure of spring 18 which brings the cones of sheave 12 together. When the motor is started, the favorable belt drive ratio provides torque multiplication through the belt and thereby produces increased torque at the output shaft to start whatever equipment is being driven. When the motor is running at full speed, e.g., when the driver shaft is rotating at 1750 r.p.m. or some other A.C.-motor speed, the weights are lifted and press against stops 29 regardless of the position of the cup 28, because the weights 20 are designed to be sufficiently heavy in action to overcome any of the usual forces acting to prevent them from reaching this position, which include the spring 18, belt forces and the general inertia and friction. This is a stable position, easy to balance, and the position of the parts as the motor decelerates is equally stable. How close the cones are clamped together depends upon the position of the cup 28, because bottoms 27 of the swing arms are pressed into contact with the rim of the cup. The position of the cup is adjusted by turning knob 45, and once it is set into position the cup is held there unless knob 45 is turned to re-adjust its position. This adjustment determines the belt pitch diameter of the driver cones 8 and 9 and therefore also determines the pitch diameter of the driven cones 13 and 14 and the speed of the output shaft 4.

The plate 50 is advantageously calibrated circumferentially to cooperate with a marker on the inwardly inclined surface 51 of the knob to facilitate setting the control so that the shaft 4 will be driven at a given speed. The compressive force of the spring 18 pushing cones 13 and 14 together must be sufficient to positively grip the belt and prevent slipping at its rated load. The compressive force generated by the swing arms 20 when driver cones 8 and 9 are running at rated motor speed must be enough that through the cooperative operation of the belt, cones 13 and 14 are forced to spread apart in spite of the action of spring 18 which presses cones 13 and 14 together.

The travel of the cup 28 is limited by the axial position of bearing 35, and generally speaking it is always in contact with bearing 35, due to the action of the torsion spring 26. As the weights 20 swing out against the stops 29 the gear sector 27 acting through cup 28 moves cone 9 toward cone 8, and the sheave assumes the preset diameter desired for high speed operation, illustrated in FIGURE 2.

When the motor is shut off, the centrifugal forces which hold the weights 20 away from the driver shaft fall off and the spring 18 then acts to return the belt and sheaves to or toward the position shown in FIGURE 1. The degree of return to a minimum output speed drive position is a function of several factors but principally the number of revolutions made by the equipment after the motor is shut off and it has come to a complete stop. Whatever the final position, the change is always in the direction of a lower output speed belt ratio or increased torque available for starting up.

Thus, when the motor is started up there is a more favorable belt ratio than exists during the operation, whatever the setting of the knob. There is an axial movement of the sheaves at each start and stop of the motor, and this distributes the lubricant to the sliding parts, and this advantage is not attained in those ordinary and competitive rubber-belt variable-speed drive mechanisms in which the spacing of the sheave cones is changed only when a change in control setting is made, often after long periods of operation in one position. A distinct advantage of the mechanism of the invention in comparison with prior art mechanisms in which the speed can be adjusted only when the motor is operating, is that the setting of the control knob can be varied when the motor is stationary as well as when it is operating.

Figure 5:
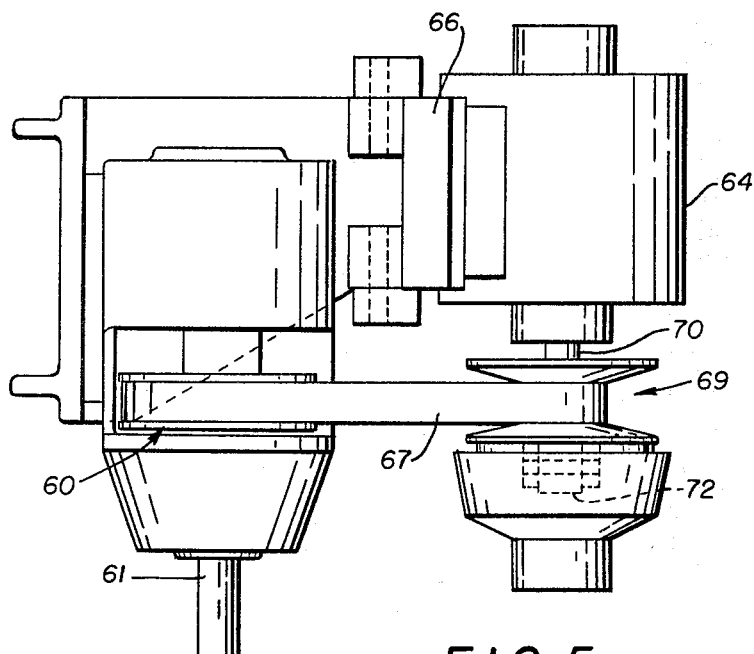
FIGURE 5 is a plan view of a drive mechanism, the motor of which is mounted on a hinged shelf so that the weight of the motor keeps the belt taut.
Figure 6:
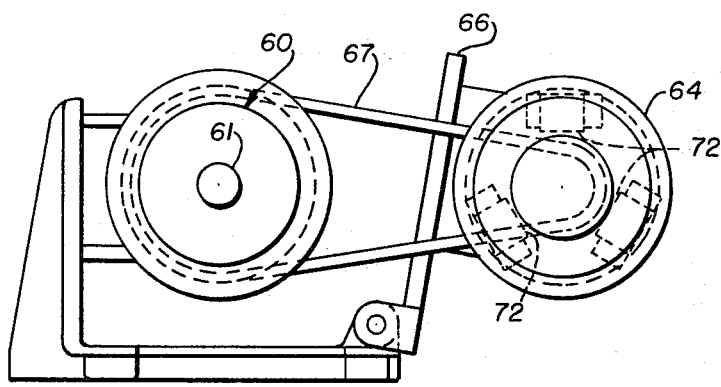
FIGURE 6 is an elevation of the same.

In FIGURES 5 and 6, the sheave 60 on the output shaft 61 of the mechanism is a fixed diameter sheave which may be either a V-sheave or a flat sheave because the weight of the motor 64 which is mounted on the hinged support 66 keeps the belt 67 taut enough to transmit the rated load without slipping at all times. The spacing of the cones of the sheave 69 on the driver shaft 70 is adjustable, and the weight of the motor 64 replaces the spring 18 of the mechanism shown in FIGURES 1–4 in spreading the sheaves when the motor is at rest. As in FIGURES 1–4, the centrifugal weights 72 overcome this force when the mechanism is operating.

Figure 7:
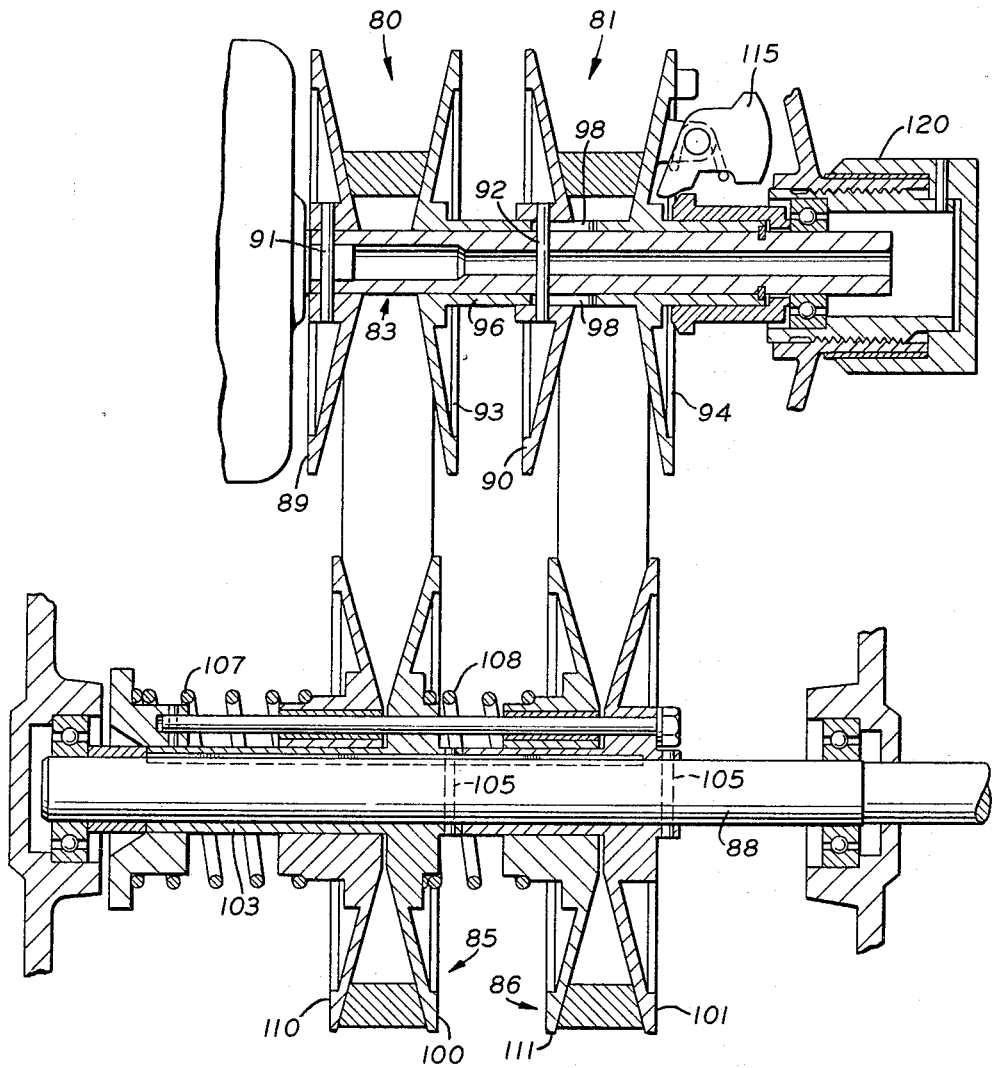
FIGURE 7 is a section which includes a plurality of sheaves on the driver shaft and the output shaft.

In FIGURE 7, there are two sheaves 80 and 81 on the driver shaft 83 and two sheaves 85 and 86 on the driver shaft 88. There may be more than two sheaves on each shaft. Also, there may be more than one output sheave with a single driver shaft, and one or more sheaves on each output shaft. The cones 89 and 90 are fixed axially of the shaft 83 by pins 91, 92. The cones 93 and 94 are integral with sleeve 96, and the pin 92 passes through slots 98 in the sleeve.

The cones 100, 101 of the sheaves on the output shaft 88 are integral with sleeve 103 and pinned through the shaft by pins 105. The springs 107 and 108 press cones 110 and 111 toward the cones 100 and 101, respectively, to maintain the tension required to prevent belt slippage.

The centrifugal mechanism 115 on a single cone is all that is required to actuate the mechanism as described, and the speed is controlled by the single control knob 120.

The invention is covered in the claims which follow.

What I claim is:

1. Variable-speed drive mechanism which includes a driver shaft and an output shaft, a sheave on each shaft, said sheave on the first shaft being composed of two substantially cone-shaped members at least one of which is movable axially of the shaft, stop means which is adjustable to provide various minimum spacings of the cone-shaped members, a flexible belt between and connecting said sheaves, belt-tensioning means sufficient to provide frictional drive of the output shaft by the belt, and centrifugally operated mechanism adapted to rotate with the sheave on said first shaft the centrifugal force of which mechanism is sufficiently great to force said cone-shaped members on the first shaft to assume an aforesaid spacing.

2. The variable-speed mechanism of claim 1 in which said first shaft is the driver shaft.

3. Variable-ratio drive mechanism which includes a driver shaft and an output shaft, said shafts being parallel to one another, one of said shafts being referred to herein as the first shaft and the other being referred to as the second shaft, a sheave on each shaft, each sheaves being composed of two cones at least one of which is movable axially of the shaft on which it is mounted, means urging the cones on the first shaft together, a belt connecting the sheave on the drive shaft with the sheave on the output shaft, the cones of both sheaves being of sufficient depth to permit the location of the belt thereon to vary and the belt being under sufficient tension to urge the cones of both sheaves apart, but insufficient to overcome the force of said means on the first shaft urging the cones together, mechanical means including centrifugal mechanism associated with the cones on the second shaft the centrifugal force of which centrifugal mechanism on rotation of the shaft is adapted to urge the cones on the second shaft together with a force which is sufficient to overcome the force of the belt urging the cones on the first shaft apart, and means for adjustably restricting the distance to which the cones on the second shaft can be forced together by said centrifugal force.

4. Variable-ratio drive mechanism which includes a drive shaft, an output shaft, and means for varying the speed-ration setting connecting them which includes a sheave comprising a fixed cone and a movable cone on the drive shaft, a sheave comprising a fixed cone and a movable cone on the output shaft with a drive belt operatively located around them, a swing arm which is pivotally mounted radially on the outer face of one of said movable cones referred to herein as the first cone, the other movable cone being provided with means which presses it toward its fixed cone, the swing arm being weighted on its outer end, which weighted end generates centrifugal force which lifts it against the first cone when rotated, and stop means adjustable axially of the first cone which the unweighted end of the swing arm is adapted to contact when lifted.

5. The mechanism of claim 4 in which a coil spring surrounding the output shaft resists movement of the movable cone away from the fixed cone.

6. The mechanism of claim 4 in which the first cone is the slidable cone of the sheave on the drive shaft.

7. The mechanism of claim 4 in which the first cone is the slidable cone of the sheave on the drive shaft and the stop means includes a cup slidably mounted on the drive shaft with a lip the end surface of which is adapted to be contacted by the outer surface of the unweighted end of the swing arm, said surfaces being, respectively, the shape of a gear tooth and the profile of a tooth rack.

8. The mechanism of claim 4 in which the first cone is the slidable cone of the sheave on the drive shaft and it includes an extension which surrounds the drive shaft, and a retaining ring fastened to the drive shaft which limits the distance said cone can travel outward along it; and in which mechanism the stop means includes a cup slidably mounted on the drive shaft with a lip toward the sheave the end surface of which is adapted to be contacted by the outer surface of the unweighted end of the swing arm, said surfaces being, respectively, the shape of a gear tooth and the profile of a tooth rack, a bearing slidable on the drive shaft beyond said retaining ring, an externally threaded sleeve concentric with the drive shaft and fastened to the bearing, said threads being in mesh with internal threads of a housing at a constant distance from the fixed cone on the drive shaft, and a knob fastened to the sleeve which is rotatable to rotate the sleeve and thus regulate the angle to which the swing arm can be moved by centrifugal force generated by the weighted end of the swing arm.

9. The mechanism of claim 4 in which the first cone includes an extension which surrounds the drive shaft, and a retaining ring is fastened to the drive shaft which limits the distance said cone can travel outward along it.

10. Variable-ratio drive mechanism which includes a drive shaft, a sheave on the drive shaft one cone of which is fixed to the drive shaft, the other cone being slidable on the drive shaft, a swing arm pivotally mounted radially on the outer surface of the slidable cone the outer end of which arm is weighted, means slidably mounted about the drive shaft the surface of which toward the cone has the profile of a tooth rack, with the unweighted end of the swing arm being the shape of a gear tooth which is adapted to be swung in sliding contact with said surface which has the profile of a tooth rack.

11. Variable-ratio drive mechanism which includes a drive shaft, a sheave on the drive shaft one cone of which is slidable along the drive shaft, stop means and a swing arm pivoted radially to the outer surface of said cone with its outer end weighted and adapted to be swung by centrifugal force against the stop means when rotated at operating speed.

12. Variable-ratio drive mechanism which includes a drive shaft, an output shaft, a sheave comprising a fixed cone and a movable cone on one shaft spring pressed toward one another, with a sheave comprising a fixed cone and a movable cone on the other shaft, and attached radially to said latter movable cone a swing arm the outer end of which is weighted and the other end of which is adapted to be swung into contact with adjustably spaceable ratio-setting means when the mechanism is operating, said sheaves being operatively connected by a drive belt.

13. Variable-speed drive mechanism which includes a driver shaft and an output shaft, a plurality of sheaves on each shaft with flexible belts connecting the sheaves on the driver shaft with the sheaves on the output shaft, each of said sheaves being composed of a pair of separable cones, at least one cone of each of said pairs being movable axially of the shaft, and belt tensioning means sufficient to force the cones of each of said pairs on the output shaft together with sufficient force to provide the friction necessary for driving through the belts, centrifugal means including mechanism associated with at least one of the cones forming a sheave on the driver shaft which forces the cones of said pairs on the driver shaft together with a force which is sufficient to completely overcome the tensioning force of the belts, and means for adjustably restricting the distance to which the cones on the driver shaft can be forced together by the force of said centrifugal means.

References Cited by the Examiner
UNITED STATES PATENTS

| | | | |
|---|---|---|---|
| 2,395,625 | 2/1946 | Heyer | 74—230.17 |
| 2,479,764 | 8/1949 | Morton et al. | 74—230.17 |
| 2,521,457 | 9/1950 | Heyer | 74—230.17 |
| 2,556,512 | 6/1951 | Ammon | 74—230.17 |
| 3,088,326 | 5/1963 | Woodward | 74—230.17 |

DAVID J. WILLIAMOWSKY, *Primary Examiner.*

L. H. GERIN, *Assistant Examiner.*